No. 781,200. PATENTED JAN. 31, 1905.
G. W. HAYDEN.
ATMOSPHERIC VALVE.
APPLICATION FILED MAR. 9, 1904.

Witnesses;
Chas. H. Ebert
A. Martin

Inventor;
George W. Hayden,
per Paul Synnestvedt
Att'y.

No. 781,200.

Patented January 31, 1905.

UNITED STATES PATENT OFFICE.

GEORGE W. HAYDEN, OF CHICAGO, ILLINOIS, ASSIGNOR TO CRANE COMPANY, OF CHICAGO, ILLINOIS, A CORPORATION OF ILLINOIS.

ATMOSPHERIC VALVE.

SPECIFICATION forming part of Letters Patent No. 781,200, dated January 31, 1905.

Application filed March 9, 1904. Serial No. 197,357.

*To all whom it may concern:*

Be it known that I, GEORGE W. HAYDEN, a citizen of the United States, residing at Chicago, in the State of Illinois, have invented certain new and useful Improvements in Atmospheric Valves, of which the following is a specification.

My invention relates to valves commonly used for outlets to the atmosphere, as through exhaust pipes and the like, and particularly to means for preventing excessive vibration or hammering and means for manually raising the valve. The objects of the invention are, to mount the valve in such a way that its motions both in opening and closing may be dampened by means of a dash pot arrangement, to provide for manually opening the valve when desired, or adjusting its position with reference to its seat, to provide a superior valve casing, and to generally improve and simplify the structure of atmospheric valves. These objects, together with advantages which will hereinafter appear, I attain by means of the construction illustrated in preferred form in the accompanying drawing, wherein—

Figure 1:
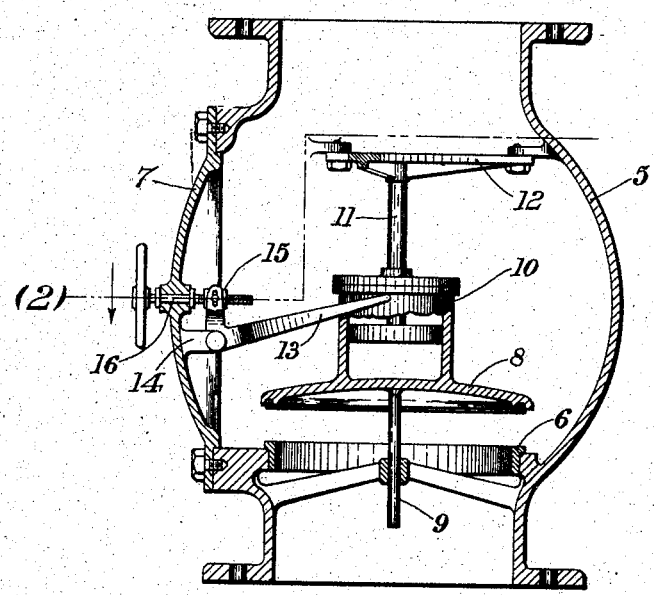
Figure 2:
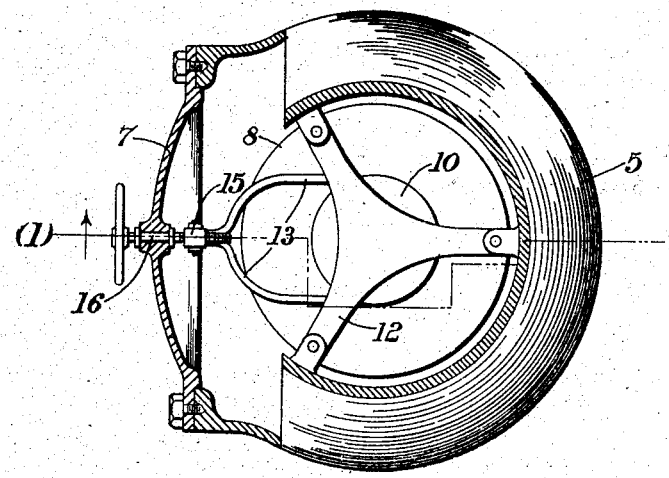

Figure 1 is a central section through the valve casing taken on line (1) in Figure 2, and Figure 2 is a partial plan view and broken horizontal section along the line (2) in Figure 1, showing the internal construction and the means for moving the valve.

In order to prevent the too sudden opening of the valve from impulses in the steam pressure, and also to prevent sudden closing of the same in case the pressure is suddenly dropped, I provide, in the casing 5 containing the valve seat 6 and the valve 8, a spider or bracket 12 which has attached to it a depending stem 11 carrying a piston upon its end. The valve disk 8 is provided with a chamber 10, which surrounds the piston and fits loosely thereon, so that the movements of the valve 8 are dampened by means of the imprisoned air in the chamber 10. The valve is guided partly by its stem 9 and partly by riding on the stem 11 of the piston working in the chamber 10.

In the side of the casing 5 I make an opening of sufficient size to remove the parts. This is closed by a cap 7 and upon this I mount the lifting finger 13, pivoted to a stud 14 and engaging some part of the chamber 10 or the valve. The lever 13 is made in bell-crank form and has an upwardly projecting arm which engages a pin on the nut block or cross-head 15. This block is moved by means of the screw 16 which projects through the side of the cap 7 and is provided with an operating handle.

In the ordinary course the valve may rest loosely upon its seat, and be raised by the steam pressure upon the under side; otherwise it may be raised or held up in any position desired by means of the lever 13. Thus the valve may be manually opened from the outside and its distance from its seat may be adjusted at pleasure by adjusting the position of the cross-head 15 upon said screw. It will be observed that the plate 7 closes an opening which is of sufficient size to remove the valve and its parts, and the spider 12, and the plate 7 carries the lever with it. It will be noted that by this arrangement I provide a straight-away valve opening and casing and means operated from the outside to adjust or lift the valve manually when desired, and no bend in the pipe is required to accommodate the valve operating means. The valve may be placed or removed without disconnecting the pipe or removing a section, and there is no substantial obstruction of the exhaust passage.

Having thus described my invention and illustrated its use, what I claim as new, and desire to secure by Letters Patent, is the following:

1. The combination of a valve casing having a straight-away opening therethrough, of a valve to close said opening moving in the axis of the casing, dampening means for said valve detachably secured inside the casing, a removable cap on the side of the casing, and means carried on said cap for manually raising the valve from outside, substantially as described.

2. The combination with a valve casing having a straight-away opening therein, a valve closing the opening, a cylinder on the valve, and a piston operating in the cylinder and a removable spider supporting the piston, substantially as described.

3. The combination with a valve casing and a valve therein having dampening means for its movements, of a removable cap on the side of the casing and a screw and bell crank lever carried entirely on the cap and adapted to manually operate the valve from outside, substantially as described.

In testimony whereof I have hereunder signed my name in the presence of the two subscribed witnesses.

GEORGE W. HAYDEN.

Witnesses:
PAUL CARPENTER,
EDWARD C. BURNS.